United States Patent [19]

Davis et al.

[11] Patent Number: 5,703,154
[45] Date of Patent: Dec. 30, 1997

[54] PREMOLDED PIPE FLASHING COMPOSITIONS

[75] Inventors: James A. Davis; William A. Wasitis, both of Indianapolis, Ind.; William F. Barham, Hope, Ark.

[73] Assignee: Bridgestone/Firestone, Inc., Akron, Ohio

[21] Appl. No.: 678,205

[22] Filed: Jul. 11, 1996

[51] Int. Cl.$^6$ .................................................. C08L 31/04
[52] U.S. Cl. ........................... 524/525; 524/191; 524/240
[58] Field of Search ........................... 524/525; 525/191, 525/240

[56] References Cited

U.S. PATENT DOCUMENTS

| | | | |
|---|---|---|---|
| 3,313,559 | 4/1967 | Kifer | 285/43 |
| 4,461,875 | 7/1984 | Crepeau | 525/348 |
| 4,666,785 | 5/1987 | Crepeau | 428/521 |
| 4,778,852 | 10/1988 | Futamura | 525/97 |
| 5,086,121 | 2/1992 | Hazelton et al. | 525/197 |

FOREIGN PATENT DOCUMENTS

0 494 156 B1  7/1992  European Pat. Off. ......... C08L 23/16

*Primary Examiner*—Edward J. Cain
*Attorney, Agent, or Firm*—Frank J. Troy, Sr.

[57] ABSTRACT

A premolded EPDM pipe flashing composition comprises 100 parts by weight of an elastomeric polymer comprising from about 70 to 95 parts by weight of at least one amorphous ethylene-propylene-diene terpolymer and from 5 to about 30 parts by weight of at least one crystalline or semi-crystalline ethylene-propylene-diene terpolymer; from about 35 to 175 parts by weight of a filler selected from the group consisting of reinforcing and non-reinforcing materials and mixtures thereof, per 100 parts of the polymer; from about 30 to 110 parts by weight of a processing material and mixtures thereof, per 100 parts of the polymer; and from about 0.6 to 7.5 parts by weight of a cure package, per 100 parts of the polymer, the cure package comprising from about 0.1 to 1.5 parts by weight sulfur and from 0.5 to 6 parts by weight of at least one sulfur vulcanizing accelerator. The premolded EPDM pipe flashing composition provides dimensional stability substantially equivalent to conventional black EPDM roofing membranes and meets the weathering, UV and heat aging resistance requirements as well as the viscosity, low temperature flexibility, and cured physical properties desired of commercial EPDM pipe flashing compositions.

20 Claims, 1 Drawing Sheet

PREMOLDED PIPE FLASHING COMPOSITIONS

TECHNICAL FIELD

The present invention relates generally to roof flashing and, more particularly, to premolded flashing of the type used to flash and develop a water-tight seal around pipes, tubes, and other typically cylindrical-shaped objects which may protrude or otherwise extend from the rooftop. Specifically, the present invention relates to a fast-curing, premolded pipe flashing composition comprising a plurality of different ethylene-propylene-diene terpolymers, hereinafter referred to as EPDMs, which pipe flashing composition provides dimensional stability substantially equivalent to conventional black EPDM roofing membranes and which meets the weathering, UV and heat aging resistance requirements as well as the viscosity, low temperature flexibility, and cured physical properties desired of commercial EPDM pipe flashing compositions.

BACKGROUND OF THE INVENTION

Polymeric roof sheeting is often used as single-ply roofing membrane for covering industrial and commercial flat roofs. Such membranes are typically applied to the roof surface in a vulcanized or cured state and are known to provide outstanding weathering resistance and other excellent properties desired of roofing materials. These polymeric materials, such as EPDM, butyl rubber, etc., are well known in the art and act as effective barriers to prevent the passage of moisture through the roof being covered.

However, cured polymeric roofing membranes of the type described above are not suitable for covering all parts of the roof, particularly those areas around pipes, tubes, and other typically circular-shaped or cylindrical-shaped objects which project from the rooftop. Instead, cured roofing material, typically premolded into a form which is at least partially complimentary to the shape of the object projecting from the roof (e.g., frusto-conically shaped or cylindrically-shaped flashings), is used to cover these objects or otherwise seal them from moisture on the roof. Such premolded roofing material is known as pipe flashing and is often referred to by roofers as "witches hats" or "pipe boots".

Although it remains possible to use smaller strips of roof sheeting, or alternatively, standard uncured flashings such as corner flashing or the like, to water-proof or otherwise seal the upstanding objects extending from the rooftop, it will be appreciated that pipe flashings are much easier to handle and use in sealing the objects, and provide far greater protection to the extent there are only two edges (i.e., the top edge and bottom edge) around which moisture could even attempt to enter.

Pipe flashing, in general, is not new to the roofing construction industry. For example, Kifer U.S. Pat. No. 3,313,559 describes at least one method for establishing a weather-proof seal between a roof and an upstanding pipe passing through an opening in the roof. In that patent, a frusto-conical shaped, neoprene collar having a wide base and narrow top is forced over the outer end of an upstanding pipe and is secured at its base to a dome-shaped flashing attached to a metal plate on the roof. The dome-shaped flashing has a large opening which is greater than the outer diameter of the pipe so that it may be easily slipped over the pipe. This two-piece construction described in U.S. Pat. No. 3,313,559 provides essentially the same moisture protection as the pipe flashings used today.

Pipe flashings do differ from ordinary or standard flashings such as corner flashings and the like which are essentially strips of uncured roofing membrane. Pipe flashings are premolded into a particular shape and essentially cured at the place of manufacture before being positioned on a roof. Furthermore, these pipe flashings typically must have a tensile strength at ambient temperature of at least about 1400 psi, a percent elongation at ambient temperature of at least about 350% and a die C tear resistance of at least about 190 lbs./inch.

However, pipe flashing, like the roofing membranes and corner flashings discussed above, should have excellent weathering and water absorption resistance as well as excellent heat aging performance. In this respect, pipe flashings made from EPDM compositions are well suited to provide such protection.

Commercially and with the advancement of EPDM roofing membranes, EPDM flashing compositions have become increasing more common. Furthermore, EPDM flashings, including EPDM pipe flashings, are believed to be compatible with various solvent and water-based adhesives as well as various seam tape compositions which may be laminated to and/or used in conjunction with the flashing compositions to provide self-sealing compositions.

With regard to the prior art, several patents are directed toward standard, uncured EPDM flashing compositions (as opposed to cured pipe flashing compositions). For example, Crepeau U.S. Pat. Nos. 4,461,875 and 4,666,785 both disclose an elastomeric composition which is particularly useful as roof sheeting or flashing. The composition comprises 100 parts of an elastomer selected from the group consisting of EPDM, butyl rubber or mixtures thereof; 0.1 to 3.0 parts of a compound having the structural formula [(CH$_2$)$_n$NCS]$_2$S$_6$, where n is 4 or 5; and 0 to 5.0 parts of a sulfur donor curative. Where EPDM is used, the composition more particularly requires 50 parts of a terpolymer containing 51.9 percent by weight ethylene, 39.1 percent by weight propylene and 9.0 percent by weight 5-ethylidene-2-norborene, this EPDM having a Mooney viscosity (ML/1+4 at 125° C.) of 68, and 50 parts of a second terpolymer containing 71.6 percent by weight ethylene, 23.9 percent propylene and 4.5 percent by weight 5-ethylidene-2-norborene, this second EPDM having a Mooney viscosity (ML/1+4 at 125° C.) of 77. The composition also requires the use of a hexasulfide in conjunction with the sulfur curative.

In another publication, European Patent Publication No. 0,494,156, Crepeau discloses that hexasulfide is not required where a dialkylthiourea is employed instead. Thus, this publication teaches a flashing composition comprising 100 parts of an elastomer made from EPDM or butyl rubber or both; 0.1 to 3.0 parts of a dialkylthiourea; 0.4 to 5 parts sulfur; and 0.4 parts of a sulfur accelerator.

Given this current state of the art, it is seen as highly desirable to provide EPDM pipe flashing compositions, and particularly, pipe flashing compositions which are devoid of hexasulfides or thioureas, thereby eliminating further costs of handling and production for such EPDM flashing compositions.

In order to produce suitable pipe flashing compositions, certain physical and/or chemical requirements should be met. For example and as discussed hereinabove, pipe flashings typically must have a tensile strength at ambient temperature of at least about 1400 psi, a percent elongation at ambient temperature of at least about 350% and a die C tear resistance of at least about 190 lbs./inch. Furthermore, the premolded pipe flashing should be flexible at temperatures as low as −45° F. (−43° C.) and easily expand over the cylindrical shaped protruding structure. Moreover, the Mooney viscosity of the pipe flashing compositions should be able to be adjusted in order to enable the molder of the pipe flashing to produce the pipe flashing by the molding technique of his or her choice. Typically then, the Mooney viscosity of the pipe flashing may range between about 18 and 35 Mooney units at 275° F. (135° C.), with injection molding techniques using a composition having a viscosity at the lower end of this range (about 18 to 28 Mooney units at 135° C.) which compression molding accommodates a composition with a slightly higher viscosity (about 28 to 36 Mooney units at 135° C.). In addition, the pipe flashing composition should be fast-curing, meaning it will be about 90% cured in less than about 15 minutes at temperatures at or above about 340° F. (171° C.).

Thus, the need exists for a fast-curing, EPDM pipe flashing composition which, like current uncured, calendered flashing compositions, is quick and easy to handle and install, especially around upstanding pipes and similar objects on the roof, and which meets the low temperature flexibility, tensile strength, viscosity and fast curing requirements desired of pipe flashing compositions.

SUMMARY OF THE INVENTION

It is, therefore, an object of the present invention to provide an EPDM pipe flashing composition which is suitable for use to flash around pipes, tubes, and other cylindrically shaped, upstanding objects on a roof.

It is another object of the present invention to provide an EPDM pipe flashing composition, as above, which is fast curing, flexible at low temperatures, and has a dimensional stability substantially equivalent to conventional EPDM roofing membranes.

It is yet another object of the present invention to provide an EPDM pipe flashing composition, as above, which provides excellent weathering resistance, water absorption resistance, and heat aging performance.

It is still another object of the present invention to provide an EPDM pipe flashing composition, as above, which can be made by any of several molding techniques, including but not limited to, compression, injection, and transfer press molding.

It is a further object of the present invention to provide an EPDM pipe flashing composition, as above, which is compatible with solvent and water-based adhesives as well as various seam tape compositions.

It is yet a further object of the present invention to provide an EPDM pipe flashing composition, as above, which is devoid of hexasulfides and thioureas.

In general, the objects of the present invention are accomplished by providing an EPDM pipe flashing composition comprising 100 parts by weight of an elastomeric polymer comprising from about 70 to 95 parts by weight of at least one amorphous ethylene-propylene-diene terpolymer and from 5 to about 30 parts by weight of at least one crystalline or semi-crystalline ethylene-propylene-diene terpolymer; from about 35 to 175 parts by weight of a filler selected from the group consisting of reinforcing and non-reinforcing materials and mixtures thereof, per 100 parts of the polymer; from about 30 to 110 parts by weight of a processing material and mixtures thereof, per 100 parts of the polymer; and from about 0.6 to 7.5 parts by weight of a cure package per 100 parts of the polymer, the cure package comprising from about 0.1 to 1.5 parts by weight sulfur and from about 0.5 to 6 parts by weight at least one sulfur vulcanizing accelerator.

Other objects of the invention may be accomplished by providing a method for developing a water-tight seal around an object protruding from the top of a roof comprising the step of: positioning a premoled EPDM pipe flashing around the protruding object such that a portion of the pipe flashing is in contact with the object and another portion of the pipe flashing is in contact with the roof, the pipe flashing comprising 100 parts by weight of an elastomeric polymer comprising from about 70 to 95 parts by weight of at least one amorphous ethylene-propylene-diene terpolymer and from 5 to about 30 parts by weight of at least one crystalline or semi-crystalline ethylene-propylene-diene terpolymer; from about 35 to 175 parts by weight of a filler selected from the group consisting of reinforcing and non-reinforcing materials and mixtures thereof, per 100 parts of the polymer; from about 30 to 110 parts by weight of a processing material and mixtures thereof, per 100 parts of the polymer; and from about 0.6 to 7.5 parts by weight of a cure package per 100 parts of the polymer, the cure package comprising from about 0.1 to 1.5 parts by weight sulfur and from about 0.5 to 6 parts by weight of at least one sulfur vulcanizing accelerator.

At least one or more of the foregoing objects which shall become apparent to those skilled in the art are described in greater detail with reference to the specification which follows.

BRIEF DESCRIPTION OF THE DRAWING

The drawing FIGURE provides a side elevational view, partially cross-sectional, of a premolded pipe flashing of the present invention positioned around a pipe protruding from a roof.

PREFERRED EMBODIMENT OF THE INVENTION

As noted hereinabove, flashing compositions containing EPDM have become increasingly more common. The term EPDM is used in the sense of its definition as found in ASTM D-1418-85 and is intended to mean a terpolymer of ethylene, propylene and a diene monomer. Although not to be limited thereto, illustrative methods for preparing such terpolymers are found in U.S. Pat. No. 3,280,082 the disclosure of which is incorporated herein by reference.

In the pipe flashing composition of the present invention, a plurality of EPDMs are employed as 100 percent of the elastomeric polymer of the composition. At least one of these EPDMs should be substantially amorphous, meaning it should have a weight percent crystallinity approaching zero, and preferably less than 1 weight percent, while at least another of these EPDMs is substantially crystalline, or at least semi-crystalline. By the term "crystalline", it is meant that the polymer should have a weight percent crystallinity of at least about 2 weight percent, while "semi-crystalline" is used to refer to those polymers having a crystallinity of from at least about 1 weight percent up to about 2 weight percent.

More particularly, the elastomeric EPDM pipe flashing composition of the present invention should comprise a major amount of at least one amorphous EPDM terpolymer (from about 70 to about 95 parts by weight thereof) and a comparatively minor amount at least one crystalline EPDM terpolymer (from about 5 to about 30 parts by weight thereof). More preferably, the composition should include from about 80 to 85 parts by weight of amorphous EPDM and from about 15 to about 20 parts by weight of crystalline or semi-crystalline EPDM.

Any EPDM terpolymer containing up to about 1 weight percent crystallinity and exhibiting the properties discussed hereinbelow should be suitable for use in the present invention. Typically, amorphous EPDMs having less than about 60 weight percent ethylene and from about 1.5 to about 3 weight percent of the diene monomer with the balance of the terpolymer being propylene or some other similar olefin type polymer is desired. Such EPDMs also preferably exhibit a Mooney viscosity (ML/1+4 at 125° C.) of about 45 and preferably have up to about 3 weight percent unsaturation.

The diene monomer utilized in forming these amorphous EPDM terpolymers is preferably a non-conjugated diene such as 5-ethylidene-2-norbornene. Illustrative examples of other non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1, 5-hexadiene, cyclooctadiene, 1,4-octadiene, 1,7-octadiene, 5-methylene-2-norbornene, 5-n-propylidene-2-norbornene, 5-(2-methyl-2-butenyl)-2-norbornene and the like.

A typical amorphous EPDM terpolymer having less than 1 weight percent crystallinity is available from Exxon Chemical Co. under the tradename Vistalon® MD-2727. This EPDM terpolymer has a Mooney viscosity (ML/1+4 at 125° C.) of about 44±5, an ethylene content of about 56 weight percent and about 2.1 weight percent unsaturation. Another example of an EPDM having less than 1 weight percent crystallinity is Royalene 3399, available from Uniroyal Chemical. This EPDM terpolymer has a Mooney viscosity (ML/1+4 at 125° C.) of about 45±5, an ethylene content of about 58 weight percent and about 1.5 weight percent unsaturation.

It will be appreciated that, with respect to the amorphous EPDM, one or more such EPDM may be used. Similarly, with regard to the crystalline or semi-crystalline EPDM, only one or more than one may be employed.

For crystalline and semi-crystalline EPDMs, any such EPDM having more than about 1 weight percent crystallinity from the ethylene component is believed suitable for the present invention. More particularly, these EPDMs preferably should contain at least about 60 weight percent ethylene and at least about 3 weight percent of the diene monomer with the balance of the terpolymer being propylene or some other similar olefin type polymer. Although not necessarily limiting, such EPDMs also should exhibit a Mooney viscosity (ML/1+4 at 125° C.) of from about 47 to about 65 and should have at least about 3 weight percent of unsaturation. Non-conjugated dienes like those exemplified hereinabove for the amorphous EPDMs can also be used for these types of EPDMs.

A typical crystalline EPDM having more than 2 weight percent crystallinity is available from Exxon Chemical Co. under the tradename Vistalon® 3708. This EPDM terpolymer has a Mooney Viscosity (ML/1+4 at 125° C.) of about 52=5, an ethylene content of about 69 weight percent and about 3.2 weight percent unsaturation.

A typical semi-crystalline EPDM having more than 1 weight percent crystallinity is available from Uniroyal Chemical Co. under the tradename Royalene 502. This EPDM has a higher ethylene content than the amorphous EPDMs, but does have less than 2 weight percent crystallinity. Royalene 502 can be further characterized as having a Mooney viscosity (ML/1+4 at 125° C.) of 60±5, an ethylene content of about 62.5 weight percent and about 4.5 weight percent unsaturation.

In the preferred embodiment, the pipe flashing compositions of the present invention include from about 80 to 85 parts by weight amorphous EPDM terpolymer and from about 15 to 20 parts by weight crystalline and/or semi-crystalline EPDM terpolymer. Unlike corner flashing and other conventional flashings where it is typically desired to have a relatively low green strength, the pipe flashings of the present invention preferably have a relatively high tensile at break of at least about 1400 psi at ambient temperature (about 73° F./23° C.). In fact, ASTM D4811-90 specifies that flashing in the vulcanized state must have a minimum tensile strength of 1305 psi. Accordingly, use of 100 percent amorphous EPDM for pipe flashing is not recommended, since 100 percent amorphous EPDM provides a tensile strength of only about 1100–1200 psi.

It will be appreciated that the resultant pipe flashing composition containing the blend of EPDM terpolymers is fast curing. As shown hereinbelow, the composition will cure rapidly at temperatures above about 300° F. (149° C.). It will also be appreciated that the rate of cure can be adjusted by increasing the amount of unsaturation (i.e., diene monomer) in the polymer blend. For example, where the amorphous EPDM, Vistalon 2727, and the crystalline EPDM, Vistalon 3708, are employed to form the base polymer blend of the pipe flashing composition, increasing the amount of Vistalon 3708 (3.2 weight percent unsaturation) and reducing the amount the Vistalon 2727 (2.1 weight percent unsaturation) will result in a faster curing pipe flashing composition. Also, the rate of cure can also be accelerated by increasing the amount of sulfur and/or accelerators as well.

In addition to the blend of EPDM terpolymers employed, the flashing composition of the present invention also includes fillers, processing oils and curatives as well as other optional rubber chemical additives including activators, all of which are discussed hereinbelow.

With respect to the filler, suitable fillers are selected from the group consisting of reinforcing and non-reinforcing materials, and mixtures thereof, as are customarily added to rubber. Examples include both inorganic and organic materials such as carbon black, mineral fillers, ground coal, cryogenically or ambiently ground rubber, and the like. Generally, preferred fillers include carbon black and cryogenically or ambiently ground rubber. Preferred amounts of these fillers range from about 35 to about 175 parts by weight, per 100 parts of the polymer.

Carbon black is used in an amount of about 35 parts to about 150 parts per 100 parts of polymer (phr), preferably in an amount of about 60 to about 120 phr. The preferred range of carbon black herein (60 to 120 phr) is about equal to the amount of carbon black normally used in preparing sulfur-cured, conventional EPDM membrane sheeting or flashing. The carbon black useful herein may be any carbon black suitable for the purposes disclosed hereinbelow. Preferred are furnace blacks such as GPF (general-purpose furnace), FEF (fast-extrusion furnace) and SRF (semi-reinforcing furnace). Most preferred is N650 HiStr GPF Black, a petroleum-derived, black reinforcing filler having an average particle size of about 60 nm and a specific gravity of about 1.80 g/cc.

Essentially any cryogenically or ambiently ground rubber may be employed as a filler in the composition of the invention. The preferred cryogenically or ambiently ground rubbers are cryogenically or ambiently ground EPDM, butyl, neoprene and the like. A preferred cryogenically or ambiently ground rubber is a ground EPDM rubber. The preferred ground EPDM rubber is a fine black rubbery powder having a specific gravity of 1.160±0.015 g/cc and a particle size ranging from about 30 to about 300 microns with an average particle size ranging from about 50 to about 80 microns. Amounts range from about 0 to 30 phr with about 2 to 15 phr being preferred. Significantly, this amount of ground rubber is less than is found in current EPDM flashings and membranes.

With respect to mineral fillers, suitable fillers may be selected from the group consisting of hard clays, soft clays, chemically modified clays, mica, talc, alumina trihydrate, calcium carbonate, titanium dioxide, amorphous precipitated hydrated silica and mixtures thereof. These mineral fillers are typically used as secondary fillers which may partially replace carbon black, or the cryogenically or ambiently ground rubbers, or any of the other reinforcing or non-reinforcing materials. Typically, these mineral fillers may be used in amounts ranging from 0 to about 50 parts per 100 parts of polymer (phr) by weight, although the amounts may vary significantly depending upon the particular mineral filler employed.

With respect to the clay fillers, four basic types of clays are normally used as reinforcing fillers for rubber elastomers. The different types of clay fillers include airfloated, water washed, calcined and surface treated or chemically modified clays.

The airfloated clays are the least expensive and most widely used. They are divided into two general groups, hard and soft, and offer a wide range of reinforcement and loading possibilities. When used, hard clays are used in amounts of from about 5 phr to about 50 phr, and more preferably, in amounts of from about 10 to about 35 phr. If equivalent compound hardness is to be maintained when hard clay replaces carbon black, approximately 1.5 to 1.75 phr hard clay should be used for every 1 phr of carbon black replaced. Any commercially available hard clay may be used. The preferred airfloated hard clays used are: Suprex®, Barden R®; LGB® all commercially available from J. M. Huber Corporation.

If used at all, the airfloated soft clays are used in amounts of from about 5 phr to about 50 phr. Again, in order to maintain equivalent compound hardness, 1.5 to 1.75 phr soft clay should be used for every 1 phr of carbon black replaced. The preferred airfloated soft clays used are Paragons; and K-78® commercially available from J. M. Huber Corporation and Hi-White R® clay from Evans Clay.

Water washed clays are normally considered as semi-reinforcing fillers. This particular class of clays are more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB, all are commercially available from J. M. Huber Corporation.

The third type of clay includes calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M. Huber Corporation.

The final type of clay includes the chemically modified reinforcing clays. Cross-linking ability is imparted to the clay by modifying the surface of the individual particles with a polyfunctional silane coupling agent. When used, chemically modified clays are used in amounts ranging from about 5 phr to about 50 phr. Where equivalent cured compound hardness is desired, about 1.5 phr of chemically modified clay is used for every 1 phr carbon black replaced. Normally the specific gravity of most clays is about 2.60 at 25° C. The preferred chemically modified clays are commercially available from J. M. Huber Corporation and include: Nucap® 100, Nucap® 200, Nucap® 190, Nucap® 290, Nulok® 321, Nulok® 390 and Polyfil® 368.

Other useful mineral fillers, which are also non-black, include amorphous silica (silicon dioxide). Silicas are generally classed as wet-process, hydrated silicas because they are produced by a chemical reaction in water, from which they are precipitated as ultrafine, spherical particles. Silica can be employed in the amount of about 5 phr to about 20 phr. The useful upper range is limited by the high viscosity imparted by fillers of this type. Some of the commercially available silicas which may be used include: Hi-Sil® 215, Hi-Sil® 233, Hi-Sil® EP and Silene® D all produced by PPG Industries. Also, a number of useful commercial grades of different silicas are available from J. M. Huber Corporation.

Finely ground calcium carbonate can likewise be employed in amounts ranging from about 5 phr to about 30 phr. In order to maintain equivalent compound hardness the replacement ratio for calcium carbonate to carbon black is about 2:1. Calcium carbonate generally has a specific gravity of about 2.71 and is commercially available from a number of suppliers including Harwick Chemical, J. M. Huber Corporation, Georgia Marble, Genstar Stone Products and Omya, Inc.

Titanium dioxide is typically employed in amounts of from about 5 phr to about 20 phr, when used. Both the ruffle and anatase form of titanium dioxide may be used, however, the ruffle form is preferred and includes such products as TiPure® R-960, which is a fine, white powder having a specific gravity of about 3.9 and commercially available from DuPont de Nemours of Wilmington, Del.

Other commercially available "non-black" mineral fillers may also be employed in this invention. These include talc (magnesium silicate), mica (mixtures of sodium and potassium aluminum silicate) and alumina trihydrate. Alumina trihydrate can also be used as a flame retardant and smoke suppressant in certain EPDM roofing compositions.

The ground coal employed as a filler in the compositions of the invention is a dry, finely divided black powder derived from a low volatile bituminous coal. Ground coal has a particle size ranging from a minimum of 0.26 microns to a maximum of 2.55 microns with the average particle size of 0.69±0.46 as determined on 50 individual particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.253±0.03, an ash content of 4.80 weight % and a sulfur content of 0.75 weight %. Austin Black is commercially available from Coal Fillers, Inc., P.O. Box 1063, Bluefield, Va. When used, amounts ranging from about 10 to 35 phr are preferred. Use of ground coal is optional and an attendant reduction in the amount of carbon black or other fillers can be made to compensate for its inclusion.

With respect to the processing material, it is included to improve the processing behavior of the composition by adjusting the composition's viscosity to provide a suitable composition for molding. Depending upon the molding technique employed, the composition's viscosity should be adjusted. As noted hereinabove, where injection molding techniques are utilized, the Mooney viscosity of the composition should be lower, e.g., about 18 to 28 Mooney units at 275° F. (135° C.), than the Mooney viscosity of the composition when compression or transfer press molding techniques are utilized, e.g., about 28 to 36 Mooney units at 275° F. (135° C.).

Processing materials typically include processing oils, waxes and the like. The process oil is included in an amount ranging from about 30 parts to about 110 parts process oil per hundred parts polymer (phr), preferably in an amount ranging from about 60 phr to about 85 phr. A preferred processing oil is a paraffinic oil, e.g. Sunpar 2280, which is available from the Sun Oil Company. Other petroleum derived oils including naphthenic oils are also useful.

In addition to the above ingredients which are mixed to form a masterbatch in the preferred embodiment, activators such as zinc oxide and stearic acid may optionally be added to and made a part of the masterbatch. Amounts of these activators can vary depending upon processing needs, but it is conventional to add about 5 phr zinc oxide and about 1 phr stearic acid to the masterbatch.

A cure package containing sulfur and one or more sulfur vulcanizing accelerators is then prepared and added to the EPDM flashing composition. The cure package for the flashing composition of the present invention may range from about 0.6 phr to about 7.5 phr by weight with the preferred amounts ranging from about 3 to about 6 phr.

As part of the cure package, sulfur is preferably employed in amounts of about 0.1 to 1.5 phr, with about 1.1 phr being most preferred. Any commercially available sulfur suitable for use as a curative can be used.

In addition, the cure package provides one or more sulfur vulcanizing accelerators. Preferred accelerators include thiuram monosulfides and disulfides such as tetramethylthiuram monosulfide (TMTMS); tetrabutylthiuram disulfide (TBTDS); tetramethylthiuram disulfide (TMTDS); tetraethylthiuram monosulfide (TETMS); and the like; benzothiazole sulfenamides such as N-oxydiethylene-2-benzothiazole sulfenamide; N-cyclohexyl-2-benzothiazole sulfenamide; N,N-diisopropyl-2-benzothiazole sulfenamide; N-tert-butyl-2-benzothiazole sulfenamide (TBBS) and the like; 2-mercaptoimidazoline; N,N-diphenyl-guanadine; N,N-di-(2-methylphenyl)guanadine; 2-mercaptobenzothiazole; 2-(morpholinodithio)benzothiazole disulfide; zinc 2-mercaptobenzothiazole and the like; a sulfur donor such as dithiodimorpholine (di-morpholino disulfide) and the like, dithiocarbamates such as tellurium diethyldithiocarbamate; copper dimethyldithiocarbamate; bismuth dimethyldithiocarbamate; cadmium diethyldithiocarbamate; lead dimethyldithiocarbamate; zinc diethyldithiocarbamate and zinc dimethyldithiocarbamate.

It should be appreciated that the foregoing list is not exclusive, and that other vulcanizing agents known in the art to be effective in the curing of EPDM terpolymers may also be utilized. For a list of additional vulcanizing agents, see *The Vanderbilt Rubber Handbook*, referenced hereinabove. It will be appreciated that thioureas such as ethylene thiourea; N,N-dibutylthiourea; N,N-diethylthiourea and the like as well as various hexasulfides such as dipentamethylene thiuram hexasulfide (DPTH) are not particularly preferred, and the present invention may be devoid of these accelerators, i.e., thioureas and hexasulfides, in the pipe flashing composition. Nevertheless, those accelerators might be suitable for the subject composition in some instances.

Amounts of the various components that can be employed in the cure package are set forth in Table I hereinbelow which provides both broad and preferred ranges for each type of component, when present. Again, the total amount of the cure package employed ranges between about 0.6 and 7.5 phr, depending upon the amount of sulfur, the vulcanizing accelerators selected and the preferred cure rate for the resultant EPDM pipe flashing composition. That is, when employed as pipe flashing, the amount of sulfur and selection of sulfur vulcanizing accelerators in the flashing composition will effect the rate of curing of the pipe flashing composition. When a very fast curing composition is desired, the amount of sulfur and/or accelerators should be increased. In the preferred embodiment, about 0.95 parts sulfur, from about 0.5 to 3 parts tetramethylthiuram disulfide (TMTDS) and about 1 part dimorpholino disulfide (available as 4,4'-dithiodimorpholine from Flexsys under the tradename Sulfasan DTDM) are preferred. TMTDS is a white cream colored powder having a melting point of about 140° C., an ash content of less than 0.5 weight percent and a specific gravity of about 1.42. Sulfasan DTDM is an off-white powder or pellets having a melting point of about 125° C.

TABLE I

EPDM Pipe Flashing Compositions-Cure Packages

| Ingredients | Broad Range, phr | Preferred Range, phr |
|---|---|---|
| Sulfur | 0.1 to 1.5 | 0.7 to 1.2 |
| Thiuram accelerators | | |
| TMTMS | 0.5 to 6 | 0.5 to 3 |
| TMTDS | 0.5 to 6 | 0.5 to 3 |
| TETDS | 0.5 to 6 | 0.5 to 3 |
| Thiazole accelerators | | |
| Captax-MBT | 0.5 to 6 | 0.5 to 3 |
| Altax-MBTS | 0.5 to 6 | 0.5 to 3 |
| Sulfenamide accelerators | | |
| N-cyclohexyl-2-benzothiazole sulfenamide | 0.5 to 3 | 0.5 to 1.5 |
| N-tert-butyl-2-benzothiazole sulfenamide | 0.5 to 3 | 0.5 to 1.5 |
| Dithiocarbamate accelerators | | |
| Copper dimethyldithiocarbamate | 0.5 to 5 | 0.5 to 1.5 |
| Dimethylcyclohexylammonium dibutyl dithiocarbamate | 0.5 to 5 | 0.5 to 1.5 |
| Tellurium diethyldithiocarbamate | 0.5 to 5 | 0.5 to 1.5 |
| Hexasulfide accelerators | | |
| DPTH | 0.2 to 3 | 0.3 to 1.5 |
| Dimorpholino disulfide | 0.5 to 5 | 0.5 to 1.5 |

It is to be understood that the cure package comprises sulfur and at least one or more of the foregoing or other suitable sulfur vulcanizing accelerators and thus, the amounts presented in Table I are those wherein one or more of the above accelerators are present. As noted hereinabove, it is highly desirable that the pipe flashing composition be fast curing to the extent that it is fully cured upon being installed around the protruding object on the roof.

Other optional ingredients may include, for example, other elastomers (e.g., butyl rubber, neutralized sulfonated EPDM, neutralized sulfonated butyl rubber) in place of minor amounts of the EPDM, and conventional amounts of other conventional agents, such as antioxidants, antiozonants, flame retardants, and the like. The conventional agents are not seen to affect the essential nature of the invention, however.

The compounding ingredients can be admixed, utilizing an internal mixer (such as a Banbury mixer), an extruder, and/or a two-roll mill, or other mixers suitable for preparing viscous relatively uniform admixtures. When utilizing a type B Banbury internal mixer, in a preferred mode, the dry or powdery materials such as carbon black are added first followed by the liquid process oil and finally EPDM (this type of mixing can be referred to as an upsidedown mixing technique).

The resulting admixture is molded into a frusto-conical or conical, "witch's hat" shape having a thickness ranging from about 30 to 125 mils, and preferably from about 50 to 70 mils, by conventional molding techniques including, but not limited to, injection molding, compression molding and transfer press molding. Preferably, the admixture is formed to about 55–65 gauge (0.055–0.065 inches) which is the industry desired thickness for pipe flashing used in roofing applications.

Figure 1:
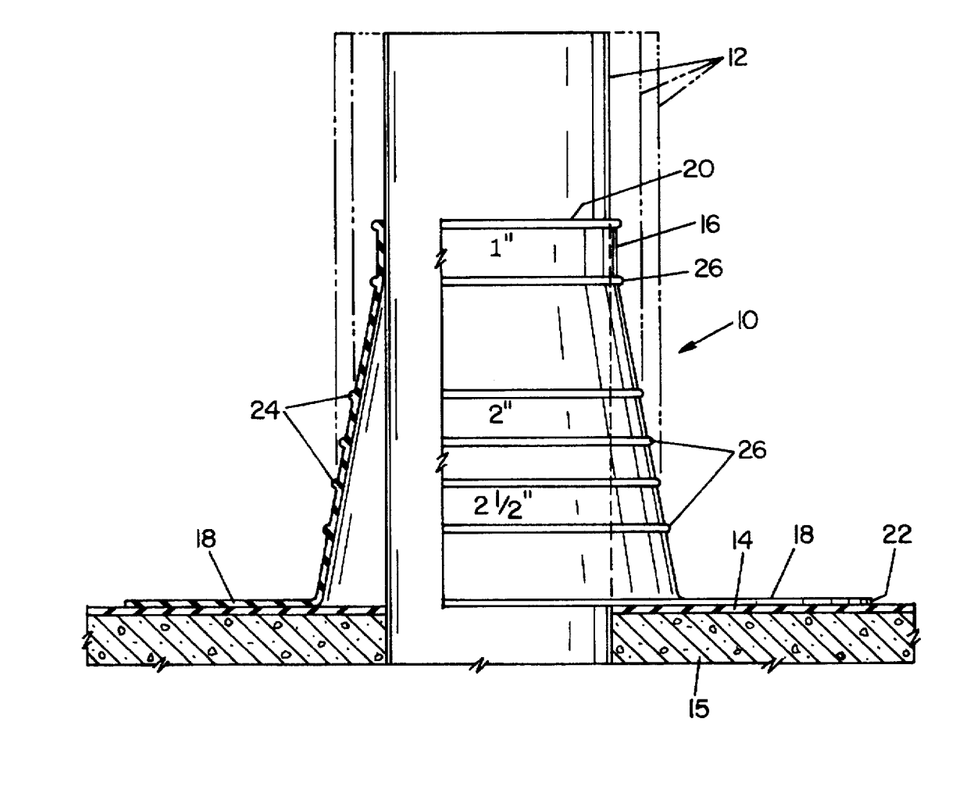

As more particularly shown in the drawing FIGURE, one representative form of a pipe flashing embodying the concepts of the present invention is generally indicated by the numeral 10 in the FIGURE. The pipe flashing is positioned around an object, such as pipe 12, protruding from the roof 14 of a building such that the top portion, denoted as 16, of the pipe flashing 10 at least partially contacts the upstanding pipe 12 while the flange portion 18 of the pipe flashing 10 contacts the roofing membrane 14 on roof 15, thereby developing a water-tight seal around the pipe 12. With this construction, it will be appreciated that there are only two edges 20, 22 through which it is even possible for water to enter between the flashing 10 and pipe 12. However, given the tightness/flexibility of the pipe flashing and the ability to use sealing rings, seam adhesives and tapes at these edges, the pipe flashing can remain water-tight for many years.

In the preferred embodiment, the resultant pipe flashing is designed to be cut along certain suggested rings around the top portion 16 of the flashing 10 so as to be useful to flash around pipes of various diameter. That is, the pipe flashing 10 may include various indicating lines or ribs denoted as 24, which suggest where the flashing 10 should be cut in order to provide a flashing which fits tightly around a pipe of a particular diameter. For example, and as shown in the drawing, a particular pipe flashing 10 may be suitable for use on pipes having a diameter of from about 1 inch to about 2.5 inches, with indications along or around the conical part of the flashing suggesting where the flashing should be cut to form a frusto-conical shaped pipe flashing which in suitable for developing a water tight seal around pipes having 2 and 25 inch diameters. In order to provide a better understanding of this, additional pipes 12 have been shown in phantom.

In addition, sealing lines or ribs 26, similar to those ribs 24, may indicate where the bottom of the seal rings (not shown) are to be placed to form the water-tight seal at the top edge 20 of the flashing 10. It will be appreciated that the diameters provided for the particular pipe flashing shown are for illustrative purposes only and that the pipe flashing may be molded to have any size or shape desired and suitable for achieving the objects of this invention. Pipe flashings as large as 6 inches in diameter are common but may be even larger if desired.

It will also be appreciated that the bottom part or flange portion 18 of the flashing 10 which can be envisioned as the "brim" of the "witch's hat", can be laminated to a compatible seam tape or other adhesive system in accordance with known commercial techniques. While any compatible seam tape or adhesive system may be employed, it is generally recognized that EPDM flashing compositions are easily laminated to EPDM or butyl rubber seam tapes or slice adhesives which, in turn, and easily applied to EPDM roofing membranes such as 14 during installation on the rooftop. Although not to be limited thereto, illustrative methods for preparing seam tapes suitable for use with the flashing compositions of the present invention are found in U.S. Pat. No. 5,242,727, the disclosure of which is incorporated herein by reference.

It will be appreciated that the resultant pipe flashing of the present invention is flexible and meets all of the requirements for desirable pipe flashing as noted hereinabove. Specifically, the pipe flashings of the present invention have a tensile strength at ambient temperature of at least about 1400 psi, a percent elongation at ambient temperature of at least about 350% and a die C tear resistance of at least about 190 lbs./inch. The Shore "A" hardness of the flashing composition preferably is about 57 to 67.

The resultant flashing is also known to exhibit excellent weathering and water absorption resistance as well as heat aging performance. Furthermore, the resultant flashing is relatively fast curing in that it can be about 90% cured in less than about 15 minutes at temperatures of 340° F. (171° C.) or higher.

In order to demonstrate practice of the present invention, several compounds were prepared and subjected to various physical property tests, as will now be set forth in detail. The EPDM polymers selected included Vistalon® MD-2727 and 3708, or Royalene® 3399 and 502.

The following examples are submitted for the purpose of further illustrating the nature of the present invention and are not to be considered as a limitation on the scope thereof. Parts are by weight, per hundred rubber hydrocarbon (phr), unless otherwise indicated.

TABLE II

| | EPDM Pipe Flashing Compositions | | | | | | | | |
|---|---|---|---|---|---|---|---|---|---|
| Example Nos. | 1 | 2 | 3 | 4 | 5 | 6 | 7 | 8 | 9 |
| Amorphous EPDM[a] | 85 | 85 | — | 85 | 85 | 85 | 85 | 85 | 85 |
| Crystalline EPDM[b] | 15 | 15 | — | 15 | 15 | 15 | 15 | 15 | 15 |
| Amorphous EPDM[c] | — | — | 80 | — | — | — | — | — | — |
| Semi-Crystalline EPDM[d] | — | — | 20 | — | — | — | — | — | — |
| Carbon Black[e] | 110 | 106.3 | 103.3 | 110 | 110 | 110 | 110 | 110 | 110 |
| EPDM Cryogrind (60 mesh) | 6.7 | 15 | 15 | — | — | — | — | — | — |
| Process Oil[f] | 80 | 75 | 78 | 82 | 82 | 82 | 82 | 82 | 82 |
| Zinc Oxide | 5 | 5 | 3.5 | 5 | 5 | 5 | 5 | 5 | 5 |

TABLE II-continued

| | EPDM Pipe Flashing Compositions | | | | | | | | |
|---|---|---|---|---|---|---|---|---|---|
| Example Nos. | 1 | 2 | 3 | 4 | 5 | 6 | 7 | 8 | 9 |
| Stearic acid | 1 | 1 | 1 | 1 | 1 | 1 | 1 | 1 | 1 |
| Masterbatch | 302.7 | 302.3 | 300.8 | 298.0 | 298.0 | 298.0 | 298.0 | 298.0 | 298.0 |
| Sulfur | 0.95 | 0.9 | 0.9 | 0.95 | 0.95 | 0.95 | 0.95 | 0.95 | 0.95 |
| TMTDS, phr (Methyl tuads) | 0.8 | 0.7 | 0.85 | 0.5 | 1 | 1.5 | 2 | 2.5 | 3 |
| Santocure NS, phr (TBBS) | 1 | 1 | 1 | — | — | — | — | — | — |
| Sulfads, phr (DPTH) | 0.4 | 0.4 | 0.4 | — | — | — | — | — | — |
| Sulfasan DTDM, phr | — | — | — | 1 | 1 | 1 | 1 | 1 | 1 |
| (dimorpholino disulfide) | | | | | | | | | |
| TOTAL (parts) | 305.85 | 305.3 | 303.95 | 300.45 | 300.95 | 301.45 | 301.95 | 302.45 | 302.95 |

[a]Vistalon MD-2727
[b]Vistalon 3708
[c]Royalene 3399
[d]Royalene 502
[e]N 650 HiStr GPF Black
[f]Sunpar 2280 Process Oil The examples illustrated in Table II comprise premolded EPDM pipe flashing compositions. Examples 1–3 comprise 100 parts by weight of a polymer blend of two EPDMs, one of which is amorphous EPDM and the other of which is either crystalline or semi-crystalline. These examples also include from about 103 to 110 phr carbon black, about 6 to 15 phr cryogenically ground EPDM rubber, about 75 to 80 phr processing oil, about 5 phr zinc oxide and about 1 phr stearic acid. A cure package comprising about 0.9 to 1 phr sulfur and about 1.4 phr in total, of sulfur vulcanizing accelerators which included DPTH was then added to the rubber masterbatch.

Examples 4–9 was similarly produced and comprise 100 parts by weight of an amorphous EPDM blended with a crystalline EPDM. Also, about 110 phr carbon black, about 82 phr processing oil, about 5 phr zinc oxide, and about 1 phr stearic acid were blended therewith to formulate the rubber masterbatch for each of these compositions. Then, a cure package comprising about 0.95 phr by weight sulfur with varying amounts (about 0.5 to 3 phr) of TMTDS and about 1 phr Sulfasan DTDM as sulfur vulcanizing accelerators were added to each of the rubber masterbatches.

The cure characteristics and scorch measurements of the samples were then determined. The cure characteristics of the fully compounded pipe flashing compositions were determined by means of a Monsanto Oscillating Disc Rheometer (ASTM D2084-81). The specific conditions employed involved using a mini-die attachment operating at 100 rpm, and the effecting of a three degree arc at 340° F. (171° C.) during the test procedure.

The compound processing characteristics of the pipe flashing compositions were determined using a Monsanto Mooney Viscometer (MV-2000E). The specific test conditions involved using a large rotor (1.5-inches in diameter) die attachment operating at 135° C. (275° F.) during testing. The Mooney viscometer provided useful information involving the compound viscosity and processing (scorch) safety of the fully compounded EPDM pipe flashing compositions.

The cure and scorch properties of each of the rubber compounds were measured and have been reported in Table III hereinbelow. Additional testing indicates that each of the examples exceeds the minimum tensile strength, elongation, and die C tear resistance requirements desired for pipe flashings. For testing purposes, dumbbell-shaped specimens were cut from individual 45 mil flat sheets according to ASTM D-412 (Method A—dumbbell and straight specimens). Modulus, tensile strength at break and elongation at break measurements were obtained using a table model Instron® tester, Model 4301, and the test results were calculated in accordance with ASTM D-412. All dumbbell specimens were allowed to set for about 24 hours, following which testing was carried out at 23° C.

The tear properties of 45 mil cured flat rubber sheets were cut with a die C (90° angle die) and determined in accordance with ASTM D-624. The die C tear specimens were not nicked prior to testing. Tear resistance, in lbs/inch, was obtained using a table model Instron® Tester, Model 4301 and the test results were calculated in accordance with ASTM D-624. Testing was carried out at 23° C. Shore "A" hardness testing was conducted at 23° C. in accordance with ASTM D-2240. Thus, the resultant cured pipe flashing compositions of the present invention as exemplified in Table II can be characterized, as shown in Table III, as flexible, fast curing, and suitable for use as commercial pipe flashing compositions. Some of the physical properties are presented in Table III hereinbelow.

TABLE III

| | EPDM Pipe Flashing Compositions: Physical Properties | | | | | | | | |
|---|---|---|---|---|---|---|---|---|---|
| Example Nos. | 1 | 2 | 3 | 4 | 5 | 6 | 7 | 8 | 9 |
| Rheometer at 380° F. (193° C.) for Examples 1–3 | | | | | | | | | |
| at 340° F. (171° C.) for Examples 4–9 - 3° Arc, mini-die | | | | | | | | | |
| Scorch time, minutes | 1.31 | 1.37 | 1.46 | 3.58 | 3.52 | 3.38 | 3.23 | 3.11 | 3.04 |
| Time to 50% cure, minutes | 1.82 | 1.97 | 2.08 | 6.1 | 6.04 | 6.0 | 5.89 | 5.73 | 5.64 |

TABLE III-continued

EPDM Pipe Flashing Compositions: Physical Properties

| Example Nos. | 1 | 2 | 3 | 4 | 5 | 6 | 7 | 8 | 9 |
|---|---|---|---|---|---|---|---|---|---|
| Time to 90% cure, minutes | 2.41 | 2.57 | 2.68 | 12.4 | 11.3 | 10.4 | 9.2 | 8.06 | 7.09 |
| Maximum torque, lb. - inch | 34.1 | 30.8 | 29.9 | 29.8 | 33.4 | 35.7 | 37.6 | 38.5 | 39.8 |
| Mooney Scorch at 275° F. (135° C.) - large rotor | | | | | | | | | |
| Minimum viscosity, MU | 30.9 | 29.8 | 34.3 | 24.6 | 25.1 | 25.1 | 24.7 | 24.9 | 24.5 |
| $T_5$, minutes | 7.4 | 13.0 | 16.8 | 24.1 | 22.4 | 20.0 | 18.9 | 18.1 | 17.4 |
| $T_{35}$, minutes | 14.4 | 21.0 | 16.8 | 40.9 | 37.1 | 36.1 | 35.1 | 34.0 | 33.2 |

The cure characteristics of Examples 1–9 show that the EPDM pipe flashing compositions of this invention are fast curing compared to conventional EPDM pipe flashing compositions. In each instance, the EPDM pipe flashing composition was at least 90% cured in less than about 12.5 minutes. Furthermore, it will be appreciated that the EPDM pipe flashing compositions which are devoid of hexasulfides (DPTH) (Examples 4–9) have a longer scorch time than those using hexasulfides (DPTH) (Examples 1–3). This is considered to be beneficial in that the EPDM pipe flashing composition will have increased shelf stability or shelf life. Also, these compositions can be reworked on a two-roll mill without any significant reduction in processing (scorch) safety.

The EPDM pipe flashings characterized in Table II, show tensile strengths and elongations at break which are well suited for their particular use as commercial EPDM pipe flashings. The stress-strain properties of the press cured flashing compositions indicated that as the amount of sulfur and/or accelerator is increased, modulus and tensile strength may also be increased and elongation at break becomes directionally shorter. In other words, it has been found that the tensile strength of the EPDM pipe flashing compositions can be controlled by adjusting both the ingredients as well as the amounts of the cure package.

It is to be understood that the invention is not limited to the specific types of amorphous and crystalline EPDMs exemplified herein or by the disclosure of other EPDMs, the examples having been provided merely to demonstrate practice of the subject invention. Those skilled in the art may readily select other EPDMs having the desired crystallinity characteristics. Similarly, the invention is not necessarily limited to the particular fillers and processing oil exemplified or the amounts thereof. In fact, with respect to the cryogenically ground EPDM rubber, it will be appreciated that this ingredient is essentially optional.

In conclusion, it should be clear from the foregoing examples and specification disclosure that a premolded EPDM composition comprising a major amount of amorphous EPDM and a minor amount of crystalline or semi-crystalline EPDM provides a pipe flashing composition which is suitable for developing a water tight seal around pipes, tubes and other circular-shaped objects on the roof of a building. The premolded EPDM pipe flashing composition also provides dimensional stability substantially equivalent to conventional black EPDM roofing membranes and meets the weathering, UV and heat aging resistance requirements as well as the viscosity, low temperature flexibility, and cured physical properties desired of commercial EPDM pipe flashing compositions. By changing the cure package ingredients to be devoid of hexasulfides and thioureas, the $T_5$ (time to five point rise) of the pipe flashing composition has been increased from about 7 to 17 minutes for EPDM pipe flashing at 135° C. (275° F.) to about 17 to 24 minutes at 135° C. (275° F.) for essentially the same EPDM pipe flashing compositions exemplified hereinabove.

It will be appreciated that any variables disclosed herein can readily be determined and controlled without departing from the scope of the invention herein disclosed and described. Moreover, the scope of the invention shall include all modifications and variations that fall within the scope of the attached claims.

What is claimed is:

1. A premolded pipe flashing composition comprising:
   100 parts by weight of an elastomeric polymer comprising from about 70 to about 95 parts by weight of at least one essentially amorphous ethylene-propylene-diene terpolymer; and
   from about 5 to about 30 parts by weight of at least one essentially crystalline or semi-crystalline ethylene-propylene-diene terpolymer having at least about 3 weight percent unsaturation;
   from about 35 to about 175 parts by weight of a filler selected from the group consisting of reinforcing and non-reinforcing fillers and mixtures thereof, per 100 parts of said polymer;
   from about 30 to about 110 parts by weight of a processing material selected from the group consisting of paraffinic oils, naphthenic oils and waxes and mixtures thereof, per 100 parts of said polymer; and
   from about 0.6 to about 7.5 parts by weight of a cure package, per 100 parts of said polymer, said cure package comprising from about 0.1 to 1.5 parts by weight sulfur and from about 0.5 to 6 parts by weight of at least one sulfur vulcanizing accelerator.

2. A premolded pipe flashing composition, as set forth in claim 1, wherein said elastomeric polymer includes about 80 to 85 parts by weight of said at least one ethylene-propylene-diene terpolymer having up to about 1 percent by weight crystallinity; and from about 15 to about 20 parts by weight of said ethylene-propylene-diene terpolymer having at least about 1 percent by weight crystallinity.

3. A premolded pipe flashing composition, as set forth in claim 1, wherein said filler comprises about 110 parts by weight of carbon black and said composition includes about 82 parts by weight of said processing material.

4. A premolded pipe flashing composition, as set forth in claim 1, wherein said filler further includes mineral fillers selected from the group consisting of hard clays, soft clays, chemically modified clays, mica, talc, alumina trihydrate, calcium carbonate, titanium dioxide, amorphous precipitated hydrated silica and mixtures thereof.

5. A premolded pipe flashing composition, as set forth in claim 1, wherein said sulfur vulcanizing accelerator is selected from the group consisting of thiuram monosulfides and disulfides; benzothiazole sulfenamides; dithiocarbamates; 2-mercaptoimidazoline; 2-mercaptobenzothiazole; 2-(morpholinodithio)-benzothiazole disulfide; zinc 2-mercaptobenzothiazole and dithiodimorpholine.

6. A premolded pipe flashing composition, as set forth in claim 1, wherein said cure package contains about 0.95 parts by weight sulfur, about 0.5 to about 3 parts by weight TMTDS and about 1 part by weight Sulfasan DTDM.

7. A premolded pipe flashing composition, as set forth in claim 1, wherein said cure package is devoid of hexasulfides and thioureas.

8. A premolded pipe flashing composition, as set forth in claim 1, having a thickness ranging from 55 to 60 mils.

9. A premolded pipe flashing composition, as set forth in claim 1, having a tensile strength of at least about 1400 psi.

10. A premolded pipe flashing composition, as set forth in claim 1, wherein said composition is about 90% cured within about 15 minutes at 340° F.

11. A method for developing a water-tight seal around an object protruding from the top of a roof comprising the step of:
 positioning a premoled EPDM pipe flashing around said protruding object such that a portion of said pipe flashing is in contact with said object and another portion of said pipe flashing is in contact with said roof, said pipe flashing comprising
   100 parts by weight of an elastomeric polymer comprising
    from about 70 to 95 parts by weight of at least one amorphous ethylene-propylene-diene terpolymer; and
    from 5 to about 30 parts by weight of at least one crystalline or semi-crystalline ethylene-propylene-diene terpolymer;
   from about 35 to 175 parts by weight of a filler selected from the group consisting of reinforcing and non-reinforcing materials and mixtures thereof, per 100 parts of the polymer;
   from about 30 to 110 parts by weight of a processing material and mixtures thereof, per 100 parts of the polymer; and
   from about 0.6 to 7.5 parts by weight of a cure package per 100 parts of the polymer, the cure package comprising from about 0.1 to 1.5 parts by weight sulfur and from about 0.5 to 6 parts by weight of at least one sulfur vulcanizing accelerator.

12. A method, as set forth in claim 11, wherein said elastomeric polymer includes about 80 to 85 parts by weight of said at least one ethylene-propylene-diene terpolymer having up to about 1 percent by weight crystallinity; and from about 15 to about 20 parts by weight of said ethylene-propylene-diene terpolymer having at least about 1 percent by weight crystallinity.

13. A method, as set forth in claim 11, wherein said filler comprises about 110 parts by weight of carbon black and said composition includes about 82 parts by weight of said processing material.

14. A method, as set forth in claim 11, wherein said filler further includes mineral fillers selected from the group consisting of hard clays, soft clays, chemically modified clays, mica, talc, alumina trihydrate, calcium carbonate, titanium dioxide, amorphous precipitated hydrated silica and mixtures thereof.

15. A method, as set forth in claim 11, wherein said sulfur vulcanizing accelerator is selected from the group consisting of thiuram monosulfides and disulfides; benzothiazole sulfenamides; dithiocarbamates; 2-mercaptoimidazoline; 2-mercaptobenzothiazole; 2-(morpholinodithio) benzothiazole disulfide; zinc 2-mercaptobenzothiazole and dithiodimorpholine.

16. A method, as set forth in claim 11, wherein said cure package contains about 0.95 parts by weight sulfur, about 0.5 to about 3 parts by weight TMTDS and about 1 part by weight Sulfasan DTDM.

17. A method, as set forth in claim 11, wherein said cure package is devoid of hexasulfides and thioureas.

18. A method, as set forth in claim 11, having a thickness ranging from 55 to 60 mils.

19. A method, as set forth in claim 11, having a tensile strength of at least about 1400 psi.

20. A method, as set forth in claim 11, wherein said composition is about 90% cured within about 15 minutes at 340° F.

* * * * *